(12) United States Patent
Blegen

(10) Patent No.: US 8,060,406 B2
(45) Date of Patent: Nov. 15, 2011

(54) PREDICTIVE GEO-TEMPORAL ADVERTISEMENT TARGETING

(75) Inventor: Darrell Blegen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 469 days.

(21) Appl. No.: 12/239,464

(22) Filed: Sep. 26, 2008

(65) Prior Publication Data
US 2010/0082397 A1 Apr. 1, 2010

(51) Int. Cl.
*G06Q 30/00* (2006.01)
(52) U.S. Cl. .................... 705/14.58; 705/14.64
(58) Field of Classification Search ............ 705/14, 705/14.58, 14.64
See application file for complete search history.

(56) References Cited

U.S. PATENT DOCUMENTS

| | | | |
|---|---|---|---|
| 6,208,866 B1 | 3/2001 | Rouhollahzadeh et al. | |
| 6,505,046 B1 | 1/2003 | Baker | |
| 6,647,257 B2 | 11/2003 | Owensby | |
| 6,647,269 B2 | 11/2003 | Hendrey et al. | |
| 6,665,611 B1 | 12/2003 | Oran et al. | |
| 6,684,250 B2 * | 1/2004 | Anderson et al. | 709/225 |
| 6,834,195 B2 * | 12/2004 | Brandenberg et al. | 455/456.3 |
| 6,879,838 B2 | 4/2005 | Rankin et al. | |
| 7,027,801 B1 | 4/2006 | Hall et al. | |
| 7,103,370 B1 | 9/2006 | Creemer | |
| 7,200,394 B2 | 4/2007 | Aoki et al. | |
| 2005/0071417 A1 * | 3/2005 | Taylor et al. | 709/200 |
| 2007/0073477 A1 | 3/2007 | Krumm | |
| 2008/0139181 A1 * | 6/2008 | Lokshin | 455/414.1 |
| 2008/0228568 A1 | 9/2008 | Williams | |

FOREIGN PATENT DOCUMENTS

| | | |
|---|---|---|
| KR | 1020020005147 A | 1/2002 |
| KR | 1020080039151 A | 5/2008 |
| WO | 2007126903 A1 | 8/2010 |

OTHER PUBLICATIONS

"User independent paging scheme for mobile IP" Wireless Networks, v 12, n. 2, p. 145, Apr. 2006.*
International Search Report and Written Opinion dated Apr. 12, 2010, 11 pgs.
"Ad-me: Wireless Advertising Adapted to the User Location, Device and Emotions," http://www.cs.ucd.ie/csprism/publications/Ericsson-UCD/HriAdme04.pdf, 10 pages.
"Mobile Target Advertising by Combining Self-Organization Map and Decision Tree," http://ieeexplore.ieee.org/iel5/9045/28698/01287317.pdf?tp=&arnumber=1287317&isnumber=28698, 4 pages.
"A Mobility Prediction Architecture Based on Contextual Knowledge and Spatial Conceptual Maps," http://ieeexplore.ieee.org/iel5/7755/32476/01516104.pdf?tp=&arnumber=1516104&isnumber=32476, 15 pages.

* cited by examiner

*Primary Examiner* — John Weiss
*Assistant Examiner* — Michael Stibley
(74) *Attorney, Agent, or Firm* — Shook, Hardy & Bacon L.L.P.

(57) ABSTRACT

A method, system, and medium are provided for targeting advertisements to users of mobile devices based on geo-temporal models. Time-stamped location information is collected for a mobile device and a dynamic geo-temporal model is constructed and updated when new data is collected according to a sample design. Using the geo-temporal model, device location and instances of user interaction with the device can be predicted, and advertisements can be provided based on the predicted location. Advertisements can be cached on the mobile device for later presentation, and the sample design can be updated to improve efficiency and accuracy in the modeling system.

20 Claims, 7 Drawing Sheets

PREDICTIVE GEO-TEMPORAL ADVERTISEMENT TARGETING

BACKGROUND

Mobile communications devices and mobile media devices are quickly becoming popular among consumers worldwide. As the popularity of mobile devices increases, do does the potential for targeting advertising content to users based on information that can be learned about a user's mobile device. For instance, information about the location of a mobile device can often be obtained and advertising content that is contextually relevant to that location can be targeted to a user of the mobile device.

SUMMARY

Embodiments of the invention are defined by the claims below, not this summary. A high-level overview of embodiments of the invention are provided here for that reason, to provide an overview of the disclosure.

In a first illustrative aspect, a set of computer-useable instructions provides a method of targeting advertising content to a user of a mobile device based on predicted device location. In an embodiment, the method includes collecting time-stamped device location data associated with the mobile device. The data can be collected according to a dynamically updateable sample design. An embodiment of the method includes updating a dynamic geo-temporal model that represents geo-temporal data associated with the device. Using the geo-temporal model, a device location can be predicted for a specified time period and advertisements can be selected based on the predicted location. Selected advertisements are provided to the mobile device, and can be configured to be presented to the user during the specified time period. In further embodiments of the present invention, the sample design and geo-temporal model can by dynamically updated to result in more accurate modeling and predicting, while minimizing processing burdens and network bandwidth usage.

In a second aspect, a set of computer-useable instructions provides a method of targeting advertising content to a user of a mobile device based on predicted device location and predicted user interaction with the device during a specified time period. Using a geo-temporal model, instances of user interaction can be predicted for a specified time period. The location of the mobile device can also be predicted for the specified time period. Based on the prediction, advertisements can be selected and provided to the mobile device. In embodiments of the present invention, advertisements can be cached on the mobile device for future presentation to a user.

Further embodiments of the present invention include providing a script or other executable software module to the mobile device for rendering the advertisement during a specified time. Other embodiments include updating the sample scheme periodically and updating the geo-temporal model periodically. Still further embodiments of the present invention include maintaining collected time-stamped device location data for a certain amount of time, then discarding old data to make room for new data. Decisions to discard data can be based upon efficiency and accuracy associated with the sample design and geo-temporal modeling aspects of the present invention.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
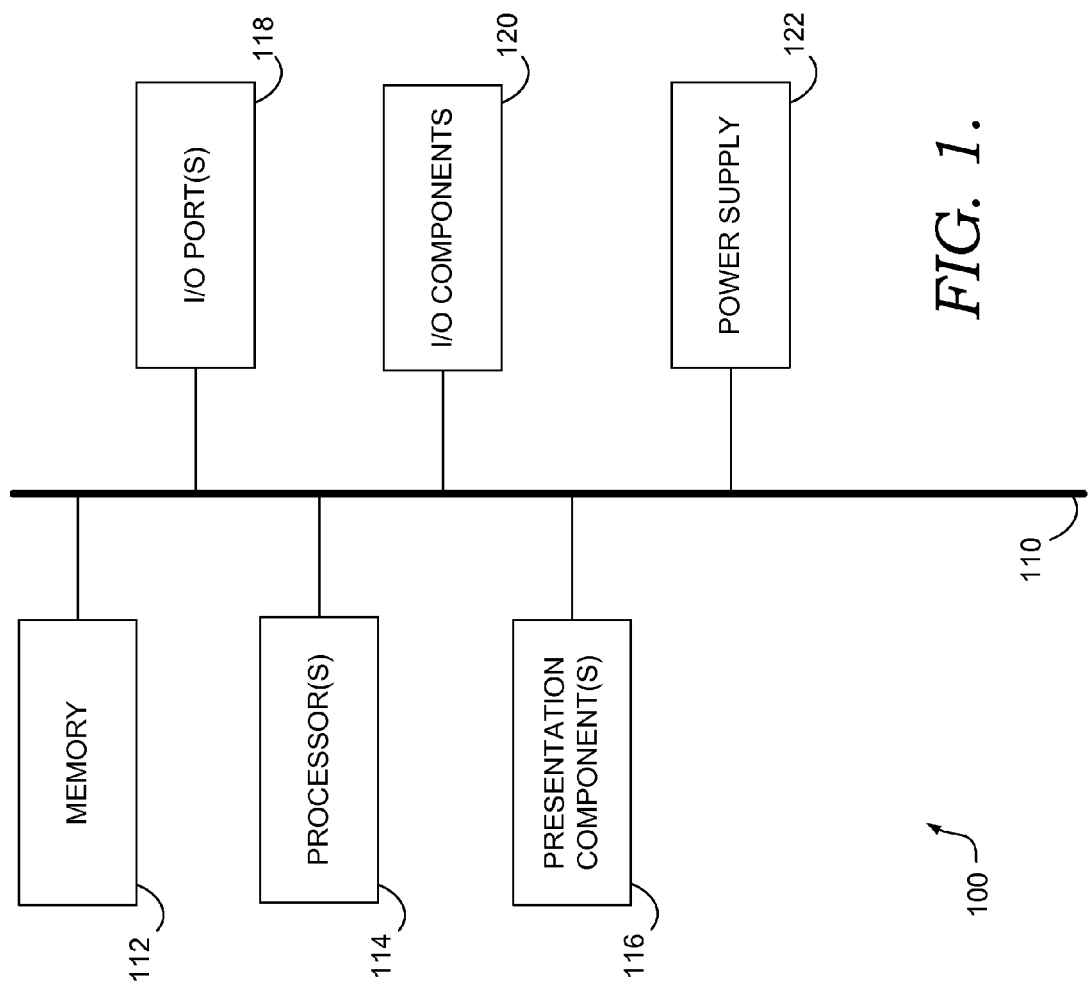
FIG. 1 is a block diagram showing an exemplary computing device in accordance with an embodiment of the present invention.

Embodiments of the present invention provide systems and methods for targeting advertisements to users of mobile communications devices or mobile media devices based on predicted device locations for specified time periods. When targeting advertising content to users of mobile devices, understanding where a customer spends most of their time or where the customer is likely to be at a particular time can enable more relevant targeting of advertising content, and thus a higher probability of realizing value from the advertising. Accordingly, embodiments of the present invention provide for predicting locations of a user at particular times and targeting advertising content to the user based on the predicted locations. Information about the locations of a mobile device at different times and on different days is collected over some period of time. The number of times that device location information is connected, and the time periods during which it is collected, can be specified by a dynamically updateable sample design. The sample design, which can be modified to enhance the usefulness of collected information, can be referenced to determine exactly when information should be collected. As device location information is collected, the information can be analyzed to create a mathematical model of device location information at different times that can be used to predict locations of the mobile device during specified time periods. That mathematical model is referred to herein as a "geo-temporal model," which reflects the fact that the model includes information about device location ("geo") at particular times ("temporal").

Embodiments of the present invention include the collection of other types of data as well such as, for example, information about when a user interacts with a mobile device, how long a user spends interacting with a mobile device, whether there is any available storage space on the mobile device, and the like. This and other information can be incorporated into the mathematical model to improve the predictive capability of the model, as well as to provide additional context for consideration when selecting advertising content to provide to a user. As information is collected over time, the mathematical model may be dynamically updated to maintain, and perhaps increase, the accuracy of the model. Additionally, embodiments of the invention include mechanisms for dynamically updating the sample design. As information is collected over time, the sample design can be evaluated to determine if it, based on the collected information and robustness of the geo-temporal model, can be improved to provide a more useful sample of information. By enabling dynamic updating of sample designs for collecting geo-temporal data as well as dynamic updating of geo-temporal models used for generating predictions, embodiments of the present invention facilitate the efficient and accurate targeting of advertisements to users of mobile communications devices.

Throughout the description of the present invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, and the like. The invention may also be practiced in distributed computing environments where tasks are performed by remote-processing devices that are linked through a communications network.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

An exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, etc.

I/O ports 118 allow computing device 100 to be logically coupled to other devices including I/O components 120, some of which may be built in. Illustrative components include a microphone, joystick, game pad, satellite dish, scanner, printer, wireless device, keyboard, pen, voice input device, touch input device, touch-screen device, interactive display device, or a mouse.

Figure 2:
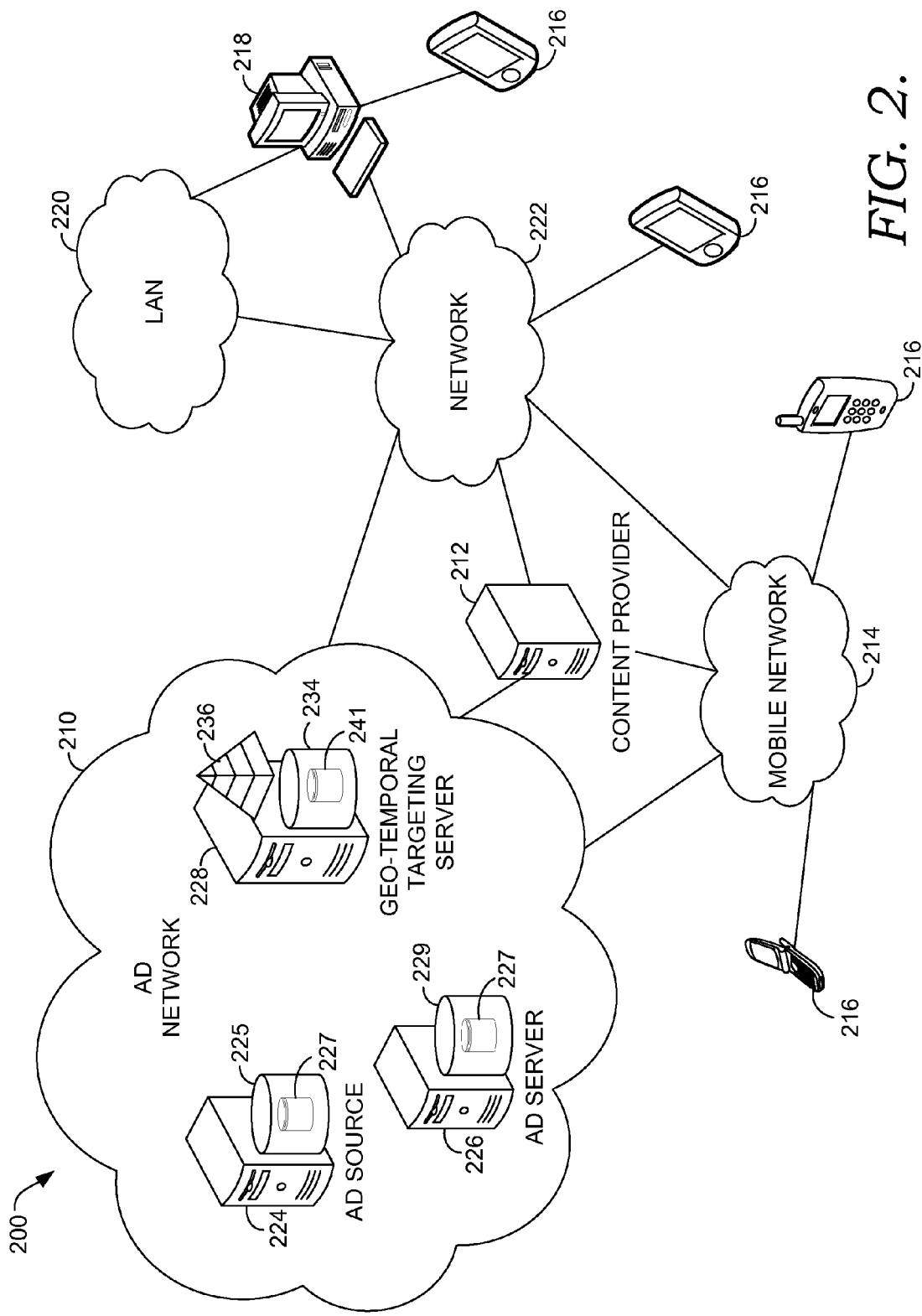
FIG. 2 is a block diagram showing an exemplary network environment suitable for implementing an embodiment of the present invention.

Turning to FIG. 2, an exemplary network environment 200 for implementing embodiments of the present invention is shown. Network environment 200 includes an advertising (ad) network 210, a content provider 212, and a mobile network 214, one or more of which can facilitate targeting of advertisements to a number of mobile devices 216. Mobile devices 216 communicate with ad network 210 and content provider 212 via mobile network 214, LAN 220, and/or network 222. Networks 210, 214, 220, and 222 can include any kind of suitable network such as, for example, a local area network (LAN), a wide area network (WAN), the Internet, a cellular network, a peer-to-peer network, or a combination of networks. Network environment 200 is merely an example of one suitable network environment and is not intended to suggest any limitation as to the scope of use or functionality of the present invention. Neither should network environment 200 be interpreted as having any dependency or requirement related to any single component or combination of components illustrated therein.

Mobile device 216 can be any kind of mobile device capable of presenting content to a user, and can include, for example, mobile devices that communicate regularly with mobile network 214 or some other network 220, 210, or 222 as well as devices that communicate periodically with a network 210, 214, 220, or 222. In an embodiment, mobile device 216 can be a computing device such as, for example, computing device 100 described above with reference to FIG. 1. According to embodiments of the present invention, mobile device 216 can include any number of types of mobile devices such as, for example, a cellular phone, a personal digital assistant (PDA), smartphone, laptop computer, handheld computing device, and the like. Additionally, in embodiments, mobile device 216 includes a cache for storing information or other content.

In an embodiment, mobile device 216 is a media content presentation device that can communicate with network 210, 214, 220, and/or 222 and/or content provider 212 such as to download media content. Exemplary media content presentation devices include, but are not limited to, ZUNE music devices, available from Microsoft Corporation of Redmond, Wash., portable video games and game systems, and the like. In another embodiment, mobile device 216 can be a removeable memory device such as, for example, a removable memory unit for an XBOX, available from Microsoft Corporation of Redmond, Wash.

Content provider 212 can include a server or other computing device that can communicate content to other devices such as, for example, mobile device 216. In other embodiments, content provider 212 includes a network. Content can include, for example, documents, files, search results, applications, music, videos, scripts, streaming multimedia and the like. In an embodiment, content provider 212 can provide content to a mobile device 216 by way of mobile network 214, network 222, or directly. In some embodiments, content provider 212 can be part of ad network 210, mobile network 214, or LAN 220. In other embodiments, content provider 212 is independent of other elements illustrated in FIG. 2 and described above.

Computing device 218 can be any kind of computing device that is capable of communicating with a network 210, 214, 220, or 222 and/or content provider 212, according to various embodiments of the present invention. In one embodiment, for example, computing device 218 is a computing device like computing device 100, illustrated in FIG. 1. Computing device 218 can be, for example, a personal computer (PC), a laptop computer, a notebook computer, a tablet computer, a PDA, a smartphone, a terminal and the like.

In one embodiment, for example, computing device 218 is a PC that a user has at home or at work. The user can connect mobile device 216 to computing device 218 such that they can communicate with each other. Computing device 218 can include software, hardware, firmware, and the like that can be used for communicating with mobile device 216. For example, in one embodiment, mobile device 216 is a portable media player such as, for example, a ZUNE device or an MP3 player. The user can connect mobile device 216 to computing device 218 and use an application to upload media content such as music, videos, and the like, from computing device 218 to mobile device 216. Computing device 218 can, in some embodiments, utilize an application programming interface (API) or an application to communicate with mobile device 216 and update files, folders, playlists, and the like that reside on mobile device 216. In other embodiments, computing device 218 can facilitate communication between mobile device 216 and network 210, 214, 220, or 222 or content provider 212. In that way, mobile device 216 can retrieve content, updates, media content, and advertisements from a content provider 212, or other entity associated with a network 210, 214, 220, or 222.

In another embodiment, computing device 218 is a video game system such as, for example, an XBOX, available from Microsoft Corporation of Redmond, Wash. Mobile device 216 can be a memory device that stores user profiles, game data, media content, or other content and that a user can connect to any one of a number of computing devices 218 such as other video game systems, computers, media players, and the like. In a further embodiment, computing device 218 can be a kiosk, a public network access terminal, a media management system such as may be available on a TV in a hotel room, or other device that can communicate with mobile device 216. According to embodiments of the present invention, computing device 218 can communicate with one or more of the other elements illustrated in FIG. 2. For example, in an embodiment computing device 218 can communicate with ad network 210 and/or content provider 212, either directly or indirectly through a LAN 220. In another embodiment, computing device 218 can communicate with ad network 210, content provider 212, mobile devices 216 (via mobile network 214), or other network nodes not illustrated.

According to an embodiment of the invention, data can be obtained from mobile device 216 that provides information about the current location of mobile device 216. It should be appreciated by those of ordinary skill in the art that location information about a mobile device 216 can be obtained in a number of different ways. For example, a component of mobile network 214 (e.g., a location server, a presence server, a router, etc.) can determine a location associated with a mobile device 216 that communicates through mobile network 214. In some embodiments, location information is retrieved via GPS technology. In other embodiments, triangulation techniques using multiple cell towers can be used to determine device location information. In further embodiments, satellite locating techniques can be utilized to determine location information associated with mobile device 216. Mobile network 214 can provide device location information to entities outside of mobile network 214 such as, for example, ad network 210, network 222, LAN 220, computing device 218, content provider 212, or mobile devices 216.

In an embodiment, mobile device 216 includes technology for determining its location or ascertaining information associated with its location. Mobile device 216 can then communicate that information to another entity, or another entity can retrieve that data from mobile device 216. In a further embodiment, when a mobile device 216 communicates with another device, mobile device 216 is associated with identifying information such as addressing information, presence information, and the like. For example, in one embodiment mobile device 216 can become associated with an internet protocol (IP) address, a MAC address, a network port, or any number of other types of addressing or locating information. IP addresses, MAC addresses, and others can be analyzed to ascertain information about the location of mobile device 216. In some embodiments, mobile device 216 can utilize an address associated with a computing device 218, an ISP, a LAN 220, and the like. Communications can be monitored to detect, record, and analyze addressing information, presence information, and other types of information relevant to location information of mobile device 216.

With continued reference to FIG. 2, ad network 210 includes ad source 224, ad server 226 and geo-temporal ad server 228. In an embodiment of the present invention, ad network 210 includes components, servers, modules, or other technology that facilitates the delivery and/or presentation of advertisements to various destinations such as, for example, mobile devices 216, computing device 218 and content provider 212. Ad network 210 is merely an example of one suitable advertising network environment and is not intended to suggest any limitation as to the scope of use or functionality of the present invention. Neither should ad network 210 be interpreted as having any dependency or requirement related to any single component or combination of components illustrated therein.

Ad source 224, ad server 226, and geo-temporal targeting server 228 can be implemented on any number of types of computing devices. In one embodiment, for example, ad source 224, ad server 226, and geo-temporal targeting server 228 can be implemented on a computing device such as computing device 100 illustrated in FIG. 1. In an embodiment, ad source 224, ad server 226, and geo-temporal targeting server 228 are each implemented on a separate machine. In other embodiments, ad source 224, ad server 226, and geo-temporal targeting server 228 are implemented on a single machine or a distributed processing system using several interconnected machines. In a further embodiment, combinations of the components 224, 226, and 228 can be implemented on any number of machines and according to any number of various combinations.

The components of ad network 210 are also scalable. That is, in embodiments of the present invention, there can be varying numbers of components. For instance, in one embodiment, ad network 210 includes one of each of ad source 224, ad server 226, and geo-temporal targeting server 228. In another embodiment, ad network 210 can include only one or two of the components 224, 226 and 228. In a further embodiment, ad source 224, ad server 226, and/or geo-temporal targeting server 228 can be maintained outside of ad network 210. Any number of configurations that provide geo-temporal targeting capabilities as described below can be suitable for implementing embodiments of the present invention.

Ad source 224 provides advertisements for presentation to users of mobile devices 216. In an embodiment, ad source 224 is a content server that has associated storage 225 for storing advertisements, and can also include links to advertisements, information about advertisements, metadata, device location data, user profile information, and the like. In an embodiment, ad source 224 can be a server, computing device, or software module that can provide advertisements or links to advertisements to a mobile device 216. In embodiments, ad source 224 might be a computing device associated with a company that produces advertisements. In another embodiment, ad source 224 can be a server that can collect, maintain, and manage numbers of advertisements that are associated with and received from various originating entities. It should be appreciated that ad source 224 can be designed to operate within various business models, purchasing schemes, and the like.

In an embodiment, ad source 224 includes storage 225. In one embodiment, storage 225 can support an advertisement (ad) database 227. In other embodiments, advertisement database can be associated with ad server 226, geo-temporal targeting server 228, or another component of ad network 210 not illustrated in FIG. 2. Ad database 227 can be maintained on a single device, or can be distributed across several devices such as, for instance, in an implementation in which ad database 227 is a database cluster. Ad database 227 can be structured according to a variety of techniques and is configured to be searchable. For example, in one embodiment, ad database 227 includes a table. In another embodiment, ad database 227 is a relational database that includes advertisement identifiers that identify advertisements stored in storage 225 as well as data associated with various attributes corresponding to the advertisement identifiers. Advertisement identifiers can include dynamically generated identification codes, hyperlinks, URLs, or other addressing or identifying information. In one embodiment, an attribute or attributes can represent information that indicates a geographical region wherein the advertisement corresponding to the associated advertisement identifier should be presented.

For instance, in an embodiment, an advertisement provider such as ad source 224 can specify particular geographical regions in which an ad should be presented to a user. That way, for example, a local sandwich shop can specify that an advertisement related thereto is presented to users when the users are within a certain distance from the shop. In another embodiment, the shop might specify that the advertisement should be played to users in the same town, to users on the same city block, and the like.

According to another embodiment, ad database 227 can include scripts, APIs, or other software modules that facilitate presentation of advertisements to users of mobile devices 216. For instance, in an embodiment, advertisements can be cached on a mobile device 216 for later presentation. The advertisement can include a tag or other indication to prompt mobile device 216 to present the advertisement at a particular time or upon the occurrence of a particular event. In an embodiment, an advertisement can be configured to be presented when a user interacts with a mobile device 216 in a particular geographical region.

According to one embodiment, a script can be cached on mobile device 216 such that, upon the satisfaction of a specified condition, the script can access the cached advertisement and cause it to be presented to the user. Specified conditions can include, for example, the occurrence of a specified time period, a user-interaction with mobile device 216, and the like. In another embodiment, the script can access, or cause mobile device 216 to access, the advertisement from a remote location such as, for example, ad source 224, ad server 226, or geo-temporal targeting server 228. According to another embodiment, an API can be cached on the mobile device 216 or maintained on an ad network component 210 such that upon satisfaction of a specified condition, the API can be invoked to facilitate presentation of the advertisement.

Ad database 227 also may be configured to store information associated with various types of advertisements. In various embodiments, such information may include, without limitation, one or more unapparent advertisements, one or more image advertisements, one or more virus cleaning/warning advertisements, one or more user feedback advertisements, advertiser and/or publisher identities and the like. In some embodiments, ad database 227 is configured to be searchable for one or more advertisements to be selected for presentation, as more fully described below.

It will be understood and appreciated by those of ordinary skill in the art that the information stored in ad database 227 may be configurable and may include any information relevant to an advertisement. Further, though illustrated as a single, independent component, ad database 227 may, in fact, be a plurality of databases, for instance, a database cluster, portions of which may reside on a computing device associated with the ad source 224 or the ad server 226, the geo-temporal ad server 228, mobile device 216, another external computing device (not shown), and/or any combination thereof.

With continued reference to FIG. 2, ad network 210 includes an ad server 226. As indicated above, in some embodiments, ad server 226 can be implemented on the same machine as ad source 224 and/or geo-temporal targeting server 228. In other embodiments, ad server 226 can be implemented independently of other components of ad network 210. Ad server 226 can be any type of server, software module, computing device or the like that is capable of communicating with other devices. Ad server 226 provides advertisements or links to advertisements to other devices such as mobile devices 216, content provider 212, computing device 218, and others. In some embodiments, advertisements include hyperlinks or other types of references that allow a user to access web sites, information, databases, and the like. Ad server 226 can facilitate user interaction with those advertisements by resolving references, mapping hyperlinks to addresses, retrieving websites, searching content, and rendering content. In some embodiments, ad server 226 can also provide click-through services for reporting user interaction with content.

Ad server 226 can include storage 229. Storage 229 can include, for example, an ad database 227, a cache for temporarily storing advertisements and other content before providing the advertisements and/or other content to users, and the like. Additionally, in some embodiments, ad server 226 is integrated with ad source 224. In other embodiments, ad server 226 is integrated with geo-temporal targeting server 228. According to another embodiment, ad server 226 can be configured to receive geo-temporal targeting information from geo-temporal targeting server 228, and use that information to select appropriate advertisements. In an embodiment, ad server 226 generates a searchable index of the advertisements and related data stored in ad database 227, which may be implemented on ad source 224, ad server 226, or geo-temporal targeting server 228.

The index and/or ad database 227 can include a weighting scheme for facilitating determinations of which advertisements to provide in various situations. For example, the advertisements can be ranked or weighted. In an embodiment, information contained in the index can include annotations or attributes associated with an advertisement that indicate situations in which the advertisement should be provided. In another embodiment, ad database 227 can include similar annotations or attributes. For instance, a particular product or company may have several advertisements associated therewith and a limited number of those advertisements may be ranked higher than the others. Accordingly, in an appropriate situation, the higher-ranked advertisements can be selected first, and if there is available bandwidth, memory, time, or the like, additional advertisements can be provided according to an order indicated by the annotations or attributes. Ad server 226 can query the index using geo-temporal targeting information in the query definition to select appropriate advertisements to present to users at particular times and in specified geographic locations.

In some embodiments, advertisements can be selected by another component of ad network 210. In various embodiments, ad server 226 retrieves selected advertisements (or information associated therewith) from any number of sources such as, for example, ad database 227, ad source 224, content provider 212, and the like. Ad server 226 communicates the advertisements or associated information to various devices such as mobile devices 216. Accordingly, a user can be presented with the advertisements by rendering the content provided by ad server 226, by selecting a hyperlink to content, or any other means of accessing advertising material provided by ad server 226.

Geo-temporal targeting server 228 includes a mobile predictive targeting engine (MPTE) 236 and data storage 234. In one embodiment, data storage 234 includes a historic user behavior database. Data storage 234 may be configured to store information associated with a plurality of system users and their associated user behaviors, as more fully discussed below. In various embodiments, such information may include, without limitation, one or more user identities, one or more probabilities related to a user, one or more scores assigned to a user, mobile devices associated with a user, time-stamped location information, and the like. In some embodiments, data storage 234 is configured to be searchable for one or more user identities based upon, for instance, an IP address or the like, and associated information, as more fully described below.

It will be understood and appreciated by those of ordinary skill in the art that the information stored in data storage 234 may be configurable and may include any information relevant to a user and their associated user behavior. Further, though illustrated as a single, independent component, data storage 234 may, in fact, be a plurality of databases, for instance, a database cluster, portions of which may reside on a computing device associated with ad source 224, ad server 226, geo-temporal ad server 228, content provider 212, mobile network 214, computing device 218, mobile devices 216, another external computing device (not shown), and/or any combination thereof.

According to an embodiment of the present invention, MPTE 236 gathers time-stamped location information associated with mobile devices 216. The information can include, for example, a description of a geographic area, a time of day, an indication of the day of the week, time since the last data was collected for the device, duration of connection or user interaction with the device, and the like. MPTE 236 includes a database 241 that can be used to store time-stamped location information associated with mobile devices 216. In an embodiment, database 241 can include a table, a relational database, or any other database structuring scheme that allows for a searchable warehouse of time-stamped location data.

In embodiments, database 241 can include a number of unique mobile device identifiers (MDIDs), each of which corresponds to a particular mobile device 216. Information gathered by MPTE 236 can be associated with the MDID that corresponds to the mobile device 216 with which the information is associated. Database 241 can also include information indicating the type of device for mobile device 216, amounts of storage space available in a cache on mobile device 216, and other user behavior data that can be used for advertisement targeting such as, for example, a user profile or a device profile that includes demographic information, user preference information, device configuration and capability information, presence information, and the like.

Information accumulated and maintained in database 241 can be updated periodically. In one embodiment, time-stamped device location information associated with a mobile device 216 can be maintained in database 241 for any desired amount of time. In an embodiment, the information is maintained for a period of several days or weeks, after which the information is discarded. In this manner, database 241 can be configured to maintain an adequate amount of available storage space, and can also be configured to maintain only enough data to create and/or update a user or device profile. According to various embodiments, a user or device profile (referred to generically herein as a profile) can include any of the types of information maintained by database 241. Additionally, a profile can contain a mathematical model representing variables such as, for example, device location information, user behavior information (e.g., information about user interactions with mobile device 216) and any other type of information that can be relevant to advertisement targeting. According to an embodiment, the information maintained in database 241 and updated by MPTE 236 can be used to predict future device location information, user interaction, and the like.

With continued reference to FIG. 2, this exemplary network architecture 200 is but one example of a suitable network environment that may be implemented to carry out aspects of the present invention and is not intended to suggest any limitation as to the scope of use or functionality of the invention. Neither should the illustrated exemplary network architecture 200, or the MPTE 236, be interpreted as having any dependency or requirement relating to any one or combination of the components 210, 212, 214, 216, 218, 220, 222, 224, 226, or 228 as illustrated. In some embodiments, one or more of the components 210, 212, 214, 216, 218, 220, 222, 224, 226, or 228 may be implemented as stand-alone devices, wireless networks, and the like. In other embodiments, one or more of the components 210, 212, 214, 216, 218, 220, 222, 224, 226, or 228 may be integrated directly into a mobile device 216. It will be understood by those of ordinary skill in the art that the components 210, 212, 214, 216, 218, 220, 222, 224, 226, or 228 illustrated in FIG. 2 are exemplary in nature and in number and should not be construed as limiting.

Accordingly, any number of components may be employed to achieve the desired functionality within the scope of embodiments of the present invention. Although the various components of FIG. 2 are shown with lines for the sake of clarity, in reality, delineating various components is not so clear, and metaphorically, the lines would more accurately be grey or fuzzy. Further, although some components of FIG. 2 are depicted as single blocks, the depictions are exemplary in nature and in number and are not to be construed as limiting.

Figure 3:
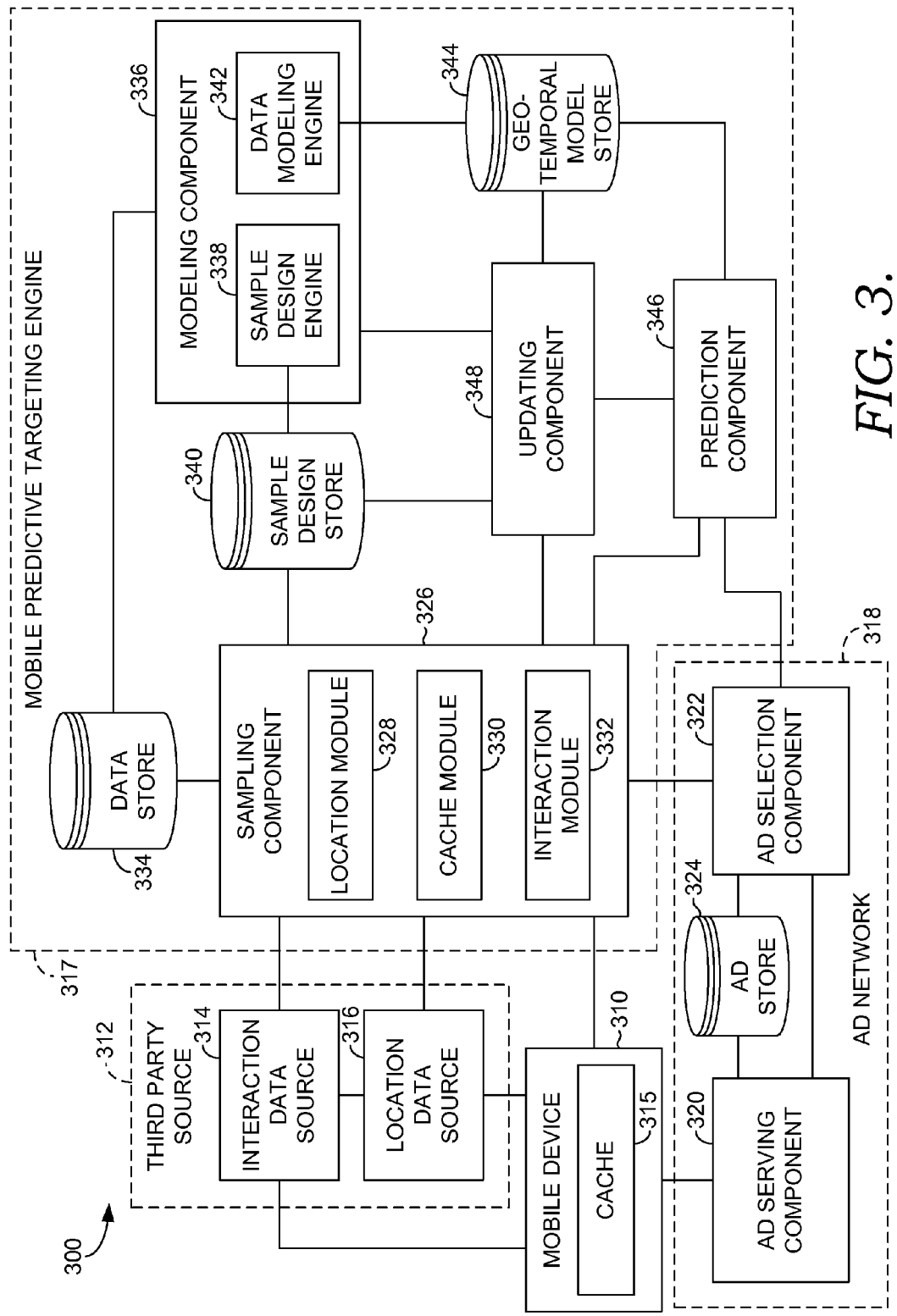
FIG. 3 is a block diagram showing an exemplary computing system suitable for implementing an embodiment of the present invention.

Turning now to FIG. 3, a block diagram of an exemplary system implementation 300 of an embodiment of the present invention is illustrated. System implementation 300 is merely an example of one suitable network environment and is not intended to suggest any limitation as to the scope of use or functionality of the present invention. Neither should system implementation 300 be interpreted as having any dependency or requirement related to any single component or combination of components illustrated therein.

Illustrative system implementation 300 includes a mobile device 310, a third party source 312, a mobile predictive targeting engine (MPTE) 317, and an ad network 318. Mobile device 310 includes a cache 315. As indicated above, cache 315 can be used, according to embodiments of the invention, to store advertisements or information associated with advertisements. In an embodiment, the stored advertisements can be presented to a user of mobile device 310 at a later time. Additionally, mobile device 210 can be configured to ascertain the amount of space available for storage in the cache. The amount of space available can be communicated to other elements of exemplary system 300 such as, for example, MPTE 317, third party source 312 and/or ad network 318. In another embodiment, an external device can ascertain the amount of available space on the cache. For instance, MPTE 317 may be configured to ascertain and/or retrieve cache availability from mobile device 310.

According to one embodiment, as illustrated in FIG. 3, ad network 318 includes an ad serving component 320, an ad selection component 322, and an ad store 324. It should be understood that each of these components 320, 322, and/or 324 can be implemented on a single machine, on multiple machines, or in a distributed computing environment.

MPTE 317 includes a sampling component 326, a modeling component 336, a prediction component 346, an updating component 348, a data store 334, a sample design store 340, and a geo-temporal model store 344. In some embodiments, one or more of the components 326, 336, 346, 348, 334, 340, and 344 may be implemented as stand-alone applications. In other embodiments, one or more of the components 326, 336, 346, 348, 334, 340, and 344 may be integrated directly into the operating system of the geo-temporal ad server 228, ad server 226, ad source 224, content provider 212 or mobile device 216 of FIG. 2. By way of example only, the MPTE 317 may be housed in association with the advertisement database 225 of FIG. 2. In the instance of multiple servers, the present invention contemplates providing a load balancer to federate incoming queries to the servers. It will be understood by those of ordinary skill in the art that the components 326, 336, 346, 348, 334, 340, and 344 illustrated in FIG. 3 are exemplary in nature and in number and should not be construed as limiting. Any number of components or modules may be employed to achieve the desired functionality within the scope of embodiments of the present invention.

Sampling component 326 can be configured to facilitate collection of information associated with mobile device 310. In an embodiment, sampling component 326 collects information according to a dynamically updateable sample design that is maintained in sample design store 340. There can be a unique sample design associated with each mobile device 310. Additionally, sample design store 340 can include aggregate sample designs that are associated with more than one mobile device 310. Sample designs can include lists, tables, sampling distributions, formula, algorithms, and the like.

Sample designs can also be dynamically updateable. As illustrated in FIG. 3, modeling component 336 includes a sample design engine 338. Sample design engine 338 creates, updates, replaces, and otherwise manages sample designs according to which sampling component 326 collects data associated with various mobile devices 310. Sample design engine 338 communicates with sample design store 340. In another embodiment, sample design store 340 can be integrated with sample design engine 338. In these and other embodiments, sample design engine can create a new sample design associated with a mobile device 310 and store the design in sample design store 340. Sample design engine 338 can update the designs in sample design store 340.

According to an embodiment of the present invention, sample design engine 338 can update sample designs by replacing a sample design with an updated version. In another embodiment, sample design engine 338 can retrieve or otherwise access a sample design and modify the design. In the latter embodiment, processing power associated with sample design engine 338 can be minimized. In the former embodiment, the sample design engine 338 can utilize templates that facilitate rapid and structured modifications of a sample design.

Sample design engine 338 can update sample designs periodically or continuously. Updates can be user-defined in some embodiments. Additionally, updates can be automatically generated by sample design engine 338. In one embodiment, sample design engine 338 receives an indication from updating component 348 that a sample design should be updated. For instance, updating component 348 can receive information associated with other processes within MPTE 317. In an embodiment, updating component 348 takes as input a geo-temporal model that is maintained in geo-temporal model store 344 and that can be created, updated, and otherwise managed by data modeling engine 342. Updating component 348 can also take as input predictions identified by a prediction component 346 and data associated with the accuracies of predictions. In an embodiment, data associated with the accuracy of a prediction can be obtained from sampling component 326. In an embodiment, updating component 348 can generate a statistical model using, for example, Bayesian networks, neural networks, probability distribution functions, and the like. The statistical model can be used to estimate probabilities associated with obtaining accurate predictions from the geo-temporal model given the data collected according to the current sample design. Based on an assessment of the resulting probabilities, updating component 348 can determine that a new sample design is warranted.

In other embodiments, updating component 348 can generate simpler models for determining when to update sample designs. For example, prediction component 346 may predict, based on a geo-temporal model, that a User A will be interacting with mobile device 310 during a specified time period such as, for example, between 3:00 p.m. and 4:30 p.m. on Sep. 26, 2008. During the specified time period, sampling component 326 can attempt to determine whether the user interacts with mobile device 310. If the user interacts with mobile device 310 during the specified time period, updating component 348 may determine that refinement or modification of the corresponding geo-temporal model is not necessary. On the other hand, if the user does not interact with mobile device 310 during the specified time, updating component 348 may determine that either the sample design or the geo-temporal model should be updated to improve accuracy of predictions. Additionally, in some embodiments, both the sample design and geo-temporal model can be updated.

As illustrated in FIG. 3, the mobile network can be a third party content source 312. As explained above, third party content source 312 can include an interaction data source 314 that provides information associated with user interaction with mobile device 310 and location data source 316 that provides information associated with the location of mobile device 310 at various times. In some embodiments, mobile device 310 can be a mobile media presentation device such as a portable video game system, a portable music player, or the like. A user may connect mobile device 310 to a computing device, or to a remote entity via a network from time to time such as to retrieve updates, content, and the like. In this case, third party source 312 can include a computing device to which mobile device 310 is connected, a content provider that communicates with mobile device 310, or any other device, machine, software module, or the like that can collect and report data regarding user interaction and location associated with mobile device 310. In a further embodiment, there may not be a third party source 312, and user interaction data and location data can be retrieved directly from mobile device 310, from addressing information associated with mobile device 310, from monitoring network traffic that includes communications from mobile device 310, and the like.

Sampling component 326 includes a location module 328, a cache module 330, and an interaction module 332. Location module 328 and interaction module 332 facilitate the acquisition of location information and user interaction information, respectively. In an embodiment, location module 328 can interface with location data source 316 to retrieve location information and interaction module 332 can interface with interaction data source 314 to retrieve user interaction information. In another embodiment, sampling component 326 receives information through a more generalized communication port and location module 328 and interaction module 332 facilitate the identification, isolation, and aggregation of location information and user interaction information, respectively. In embodiments, information collected by sampling component 326 can be maintained in data store 334. In some embodiments, information associated with a particular mobile device 310 is maintained in data store 334 for a period of time (e.g., several days, several weeks, etc.). Updating component 348 can determine whether all of the stored data associated with a mobile device 310 is necessary to keep for maintaining an accurate geo-temporal model. If not, data can be discarded from data store 334, allowing for collection of new data that can facilitate further refinement of a geo-temporal model.

Cache module 330 can facilitate determining storage space availability associated with cache 315 on mobile device 310. In an embodiment, mobile device 310 includes cache managing components that can ascertain and report the amount of storage space available in cache 315. In another embodiment, cache module 330 can be configured to ascertain the amount of storage available in cache 315. Information associated with available storage in cache 315 can be communicated directly to data store 334, ad selection component 322 and/or any other component or combination of components implemented within exemplary system environment 300. In this way, advertisements can be selected based on information from a geo-temporal model as well as availability of storage space in cache 315. As explained above, a set of advertisements can be identified as being appropriate for presentation to a user of mobile device 310 during a specified time period, based on information derived from a corresponding geo-temporal model, other behavioral information, user profiles, user preferences, the type of device that mobile device 310 is, and the like. If there is enough storage space available in cache 315 to accommodate a first subset of higher-ranked advertisements, those can be selected for presentation. Additionally, if there still remains additional space in cache 315, a second subset of advertisements can be selected for presentation, and so on.

Referring to FIG. 3, MPTE 317 also includes a modeling component 336. Modeling component 336, as indicated above, includes a sample design engine 338 and a data modeling engine 342. Sample design engine 338 generates, updates, and otherwise manages sample designs that correspond to mobile devices 310. Data modeling engine 342 generates, updates, and otherwise manages geo-temporal models that correspond to mobile devices 310. Data modeling engine 342 also can organize, sort, classify, and otherwise analyze data such as, for example, time-stamped device location data. Data modeling engine 342 can utilize any number of model types to model geo-temporal information associated with mobile device 310. For example, data modeling engine 342 can be used to estimate probability density functions associated with distributions of data collected by sampling component 326. In another embodiment, data modeling engine 342 can perform regression analysis, ANOVA analysis, and/or any number of other techniques that can be used to model geo-temporal data associated with a mobile device 310. In some embodiments, data modeling engine 342 can use different techniques for different mobile devices 310, depending upon patterns of behavior associated with the mobile devices 310. Additionally, data modeling engine can utilize weighted graph techniques, Bayesian networks, neural networks, machine learning, multivariate regression analysis, and other techniques for modeling data associated with mobile device 310.

Updating component 348 can, in turn, apply various types of tests, models, and the like to determine a measure of the accuracy of a geo-temporal model associated with a mobile device 310, and if necessary, can work with data modeling engine 342 to update the geo-temporal model. Similarly, updating component 348 can determine efficiency and accuracy attributes associated with a sample design that corresponds to a mobile device 310. If necessary, updating component 348 can work with sample design engine 338 to update the sample design. Further, updating component 348, in some embodiments, can use information from sample design engine 338, sample design store 340, data modeling engine 342, and/or geo-temporal model store 344 for determining whether either a sample design or a geo-temporal model should be refined. It should be appreciated by those of ordinary skill in the art that some situations could warrant simultaneous refinement of both a sample design and a geo-temporal model.

Prediction component 346 can use a geo-temporal model maintained in geo-temporal model store 344 for predicting geographic locations in which a mobile device 310 will be located at specified time periods. Additionally, prediction component 346 can be used to predict instances of user interaction with mobile device 310 at specified time and/or in specified geographic locations. In some embodiments, prediction component 346 can generate a prediction by providing specified input to a geo-temporal model such as a regression formula, a probability density function, or the like, and calculating a probabilistic prediction of future behavior using the model. In another embodiment, prediction component 346 can identify confidence levels associated with various specified time periods and corresponding potential geographic or user interaction data. A confidence level can be represented, for example, by an index or attribute that provides information regarding how well the user meets a set of criteria established by an advertisement provider. Prediction component 346 can compare the confidence levels or indices against a predetermined confidence level threshold or predetermined index threshold, to determine which location information predictions and user interaction predictions are likely to be most accurate. In an embodiment, the predetermined threshold is selected such that advertising expenditures are maximized with respect to user exposure to the advertisements. For example, in one embodiment, advertisements will be selected for presentation in a predicted location if the corresponding confidence level is above 80%, where 80% is the confidence level threshold. In another embodiment, advertisements are selected for presentation in a predicted location if the corresponding index is greater than a threshold index. In other embodiments such as, for example, where advertisements are more expensive to present, a higher confidence level threshold such as 90% could be utilized.

For example, prediction component 346 might utilize a geo-temporal model associated with a mobile device 310 to determine that, on Sep. 26, 2008, in the afternoon, there is a 30% confidence level associated with a prediction that mobile device 310 will be in location 1 during that specified time period, and a 90% confidence level that mobile device 310 will be in location 2 during that specified time period. Accordingly, prediction component 346 can provide data associated with the prediction regarding location 2 to an ad selection component 322, which in turn, can select advertisements appropriate for presentation at location 2.

With further reference to FIG. 3, the exemplary system implementation 300 includes an ad network 318. Ad network 318 includes an ad serving component 320, an ad selection component 322, and an ad store 324. In various embodiments, any one or more of ad serving component 320, ad selection component 322 and ad store 324 can be implemented on a single machine. In other embodiments, each component 320, 322, and 324 can be implemented independently of the others. In one embodiment, for example, ad serving component 320, ad selection component 322 and/or ad store 324 can be maintained on ad server 226 illustrated in FIG. 2. In another embodiment, for example, ad serving component 322 is implemented on ad server 226, ad store 324 is implemented on ad source 224, and ad selection component 322 is implemented on geo-temporal targeting server 228. Any combination of components 320, 322, and 324 can be implemented, in some embodiments, on any combination of ad source 224, ad server 226, and geo-temporal targeting server 228. In a further embodiment, any combination of the components 320, 322, and 324 can be implemented in connection with, or integrated with, an implementation of MPTE 317. These are only a few illustrative embodiments, and a number of other implementation schemes that can be used to provide the functionality of the present invention as described herein are within the ambit of the present invention.

Ad serving component 320 facilitates the presentation of advertisements to users of mobile device 310. In an embodiment, ad serving component 320 provides advertisements to mobile device 310. Advertisements can include actual advertising content, information about advertising content, hyperlinks to advertisements, references to advertisements, coupons, and the like. Additionally, according to embodiments of the present invention, advertisements can include scripts, software modules, and APIs that can be invoked to render advertising content on a display of mobile device 310. Advertisements can be of any number of different formats such as audio, video, textual, graphical, and the like. In some embodiments, advertisements can be interactive and in other embodiments, advertisements are accompanied by click-through functionality so that user interaction with the advertisements can be monitored and logged. In some embodiments, ad serving component 320 resolves references, maps connections through hyperlinks, retrieves advertising content, streams content to mobile device 310, monitors click-throughs, and the like. In other embodiments, any one or more of those functions can be performed by other components of the system implementation 300.

According to an embodiment of the present invention, ad selection component 322 receives information from prediction component 346 that indicates locations, times, and/or other information relevant to targeting advertisement to a user. Based on the information received, ad selection component 322 can search ad store 324 such as by querying an index associated therewith, and retrieve advertisements that are appropriate for presentation to the user at the specified and/or predicted times, locations, and the like. In another embodiment, ad selection component 322 can also receive information from sampling component 326 that can be utilized in selecting advertisements. For example, prediction component 346 may provide a predicted location of mobile device 310 corresponding to a specified time period and sampling component 326 can provide information regarding available storage space in cache 315 on mobile device 310. Using all of this information, ad selection component 322 can select advertisements for presentation to a user of mobile device 310 in such a way as to maximize the probability of user exposure to the advertisements while minimizing processing burdens, network communications, and the like.

Ad store 324 can be used to store advertisements and information associated with advertisements. Ad store 324 can include one or more advertisement databases such as ad database 227, described above with reference to FIG. 2. Ad store can include indexes associated with advertisement databases, and can also include information associated with advertisements, mappings between hyperlinks and content, and other types of content. In some embodiments, ad store 324 can be used to store scripts, APIs, and the like.

Figure 4:
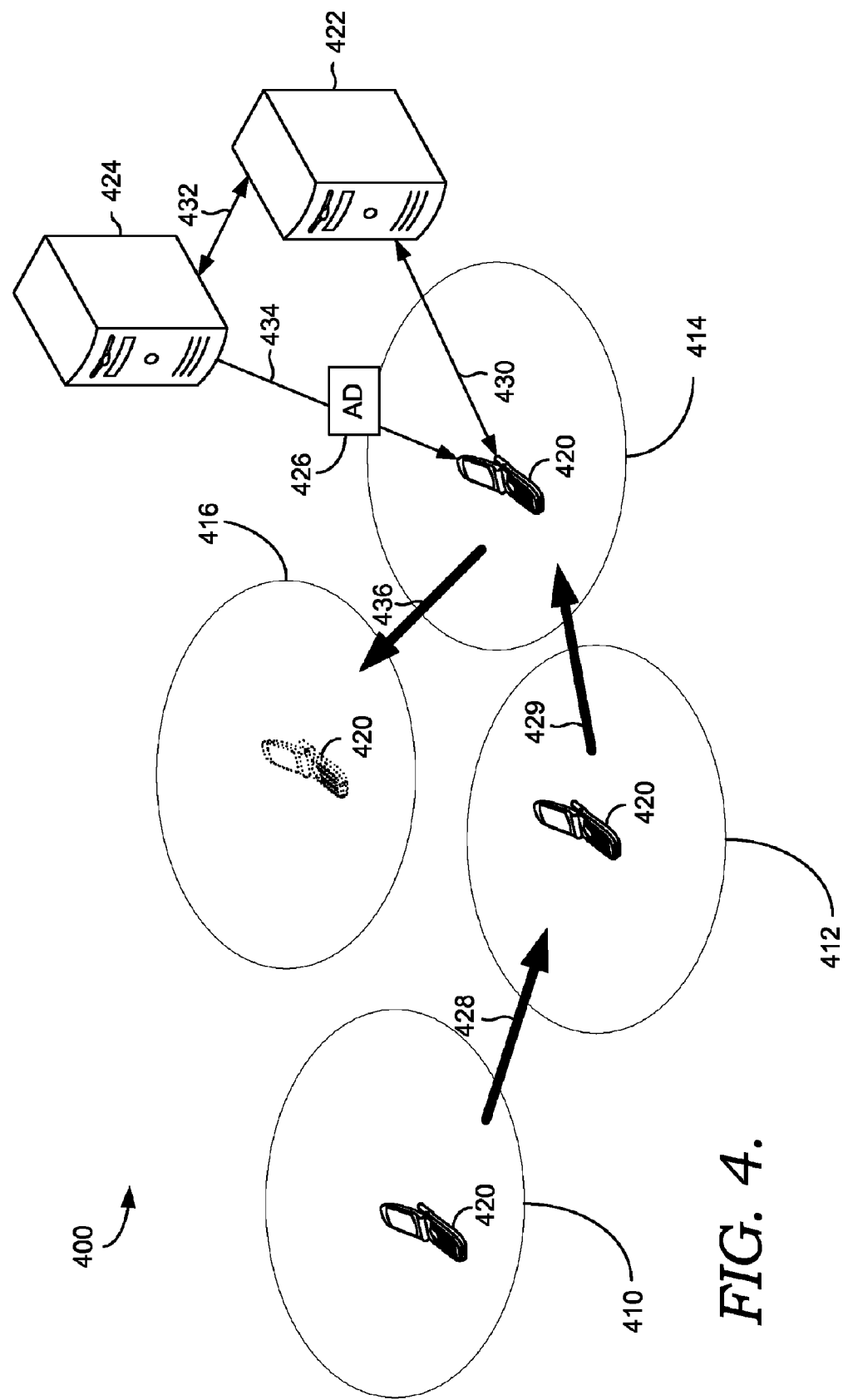
FIG. 4 is a schematic diagram showing an exemplary advertisement targeting process in accordance with an embodiment of the present invention.

Turning now to FIG. 4, a schematic diagram is shown that illustrates an exemplary geo-temporal targeted advertising process 400 according to embodiments of the present invention. FIG. 4 illustrates a first location 410, a second location 412, a third location 414, and a fourth location 416. FIG. 4 also depicts a mobile device 420, and two servers 422 and 424. Exemplary process 400 is merely an example of one suitable process implementation and is not intended to suggest any limitation as to the scope of use or functionality of the present invention. Neither should exemplary process 400 be interpreted as having any dependency or requirement related to any single component or combination of components illustrated therein.

Locations 410, 412, 414, and 416 can be any type of location and can be designated and identified in any manner suitable for modeling geo-temporal behaviors associated with mobile device 420. For example, in an embodiment, locations 410, 412, 414, and 416 can be geographic locations and can be designated in a number of ways such as by a series of coordinates that include latitude and longitude, by town, city, county, state, country, and the like. According to one embodiment of the present invention, entities with whom advertisements are associated can provide data that indicates the locations at which particular advertisements should be presented. Because different entities may use varying designation schemes for designating locations, the data provided can be normalized into a standard input scheme that enables more efficient processing throughout the various methods as described herein.

In an embodiment, for example, locations 410, 412, 414, and 416 can be cells in a cellular network. In another embodiment, locations 410, 412, 414, and 416 can be designated by addressing information (e.g., an IP address) associated with a host computing device, or with mobile device 420. In other embodiments, locations 410, 412, 414, and 416 can be regions designated by mathematical functions, and as such, can include other attributes that may be useful in targeting advertisements.

As illustrated in FIG. 4, mobile device 420 is shown at a first location 410. While at the first location, a user may interact with mobile device 420. In response to detecting user interaction with mobile device 420, device location information can be collected such as, for example, by server 422. In other embodiments, device location information, can be independently monitored by a network component and then provided to server 422 or 424. In further embodiments, a client on mobile device 420 can be configured to push device location information to servers 422 and 242.

As indicated at 428, mobile device 420 moves from the first location 410 to the second location 412. Time-stamped device location data can be collected again, depending on the sample design, when mobile device 420 is in the second location 412. As illustrated at 429, mobile device 420 travels to the third location 414. It should be understood that any amount of time may pass between the time mobile device 420 enters a location and the time that mobile device 420 exits the location. Data associated with the length of time mobile device remains in a location can be collected. Similarly, data regarding the duration of user interaction with mobile device 420 can be collected.

As illustrated at 430, during some specified period of time while mobile device 420 is in the third location 414, server 422 communicates with mobile device 420 to determine the amount of storage available on a cache associated with mobile device 420. In embodiments, server 422 may also obtain other types of information such as, for example, whether a user is interacting with the mobile device 420. Based on information collected, server 422 can select an advertisement 426, and communicate that selection to server 424, as shown at 432. Further, as illustrated at 434, the selected advertisement is provided to mobile device 420 by server 424. According to an embodiment, for example, advertisement 426 can be cached on mobile device 420 along with an indication, script, module, API, or the like, that facilitates the presentation of advertisement 426 at a specified time and location. Additionally, advertisement 426 can be configured to be presented upon the satisfaction of a specified condition.

As further illustrated at 436 in FIG. 4, mobile device 420 travels from the third location 414 to the fourth location 416. While mobile device 420 is in the fourth location 416, the advertisement 426 can be presented to the user. In some embodiments, components of either or both of servers 422 and 424 can collect time-stamped location data and use the data to generate geo-temporal models that can be used to predict future locations and instances of user interaction associated with mobile device 420.

Figure 5:
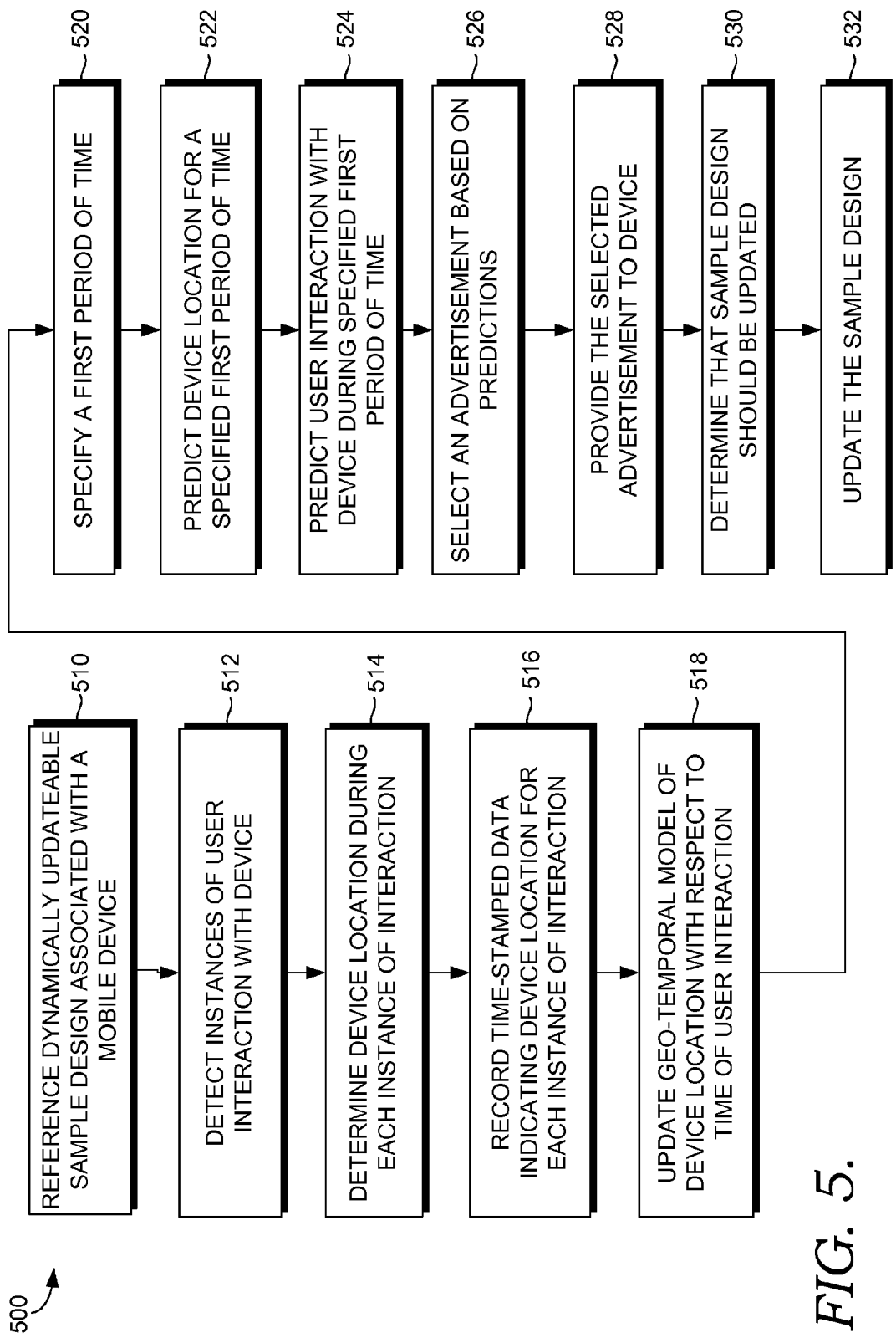
FIG. 5 is flow diagram showing an illustrative method of targeting advertisement to a user of a mobile communications device in accordance with an embodiment of the present invention.

To recapitulate, we have described systems and methods for targeting advertising content to a user of a mobile device based on predicted device location by generating geo-temporal models using data collected according to a dynamically updateable sample design. Turning to FIG. 5, a flow diagram is provided, showing an illustrative method of targeting advertising content to a user of a mobile device based on predicted device location. At a first illustrative step, step 510, a dynamically updateable sample design that is associated with a mobile device is referenced. The sample design can be used for identifying sampling time periods during which to collect device location information associated with the mobile device. In embodiments, referencing the dynamically updateable sample design can include retrieving the sample design, receiving input values derived from the sample design, calculating input values using the sample design, and the like.

At a second step 512, instances of user interaction with the mobile device are detected during sampling periods that were identified using the sample design. User interaction with the device can include, for example, the user powering on the device, the user making a phone call using the device, the user causing the device to communicate with a content provider and the like. At step 514, a location of the device is determined during each instance of user interaction with the device. As explained above, a device location can include a designation of a geographic area, a city, a county, a state, a country, or the like. Additionally, a device location can be identified and designated in terms of an IP address of a computing device to which the mobile device is connected.

At step 516, time-stamped data that indicates device location for each instance of user interaction is recorded. The time-stamped location data can be stored in a searchable database. Additionally, the recorded data can be maintained for a particular amount of time. The system can be configured to asses the usefulness of older data, and can determine appropriate times for discarding collected data, thereby making room for newly collected data. As shown at step 518 of FIG. 5, the collected time-stamped device location data is used to update a geo-temporal model that represents device location and user interaction with respect to time periods.

With continued reference to FIG. 5, a first period of time is specified, as illustrated at step 520. At step 522, a device location is predicted for the first period of time and at step 524, user interaction is predicted for the first period of time. The predictions are made by referencing the geo-temporal model corresponding to the device. In embodiments, the geo-temporal model can include model produced by regression analysis or other similar time-series forecasting technique. In those instances, locations and user interaction can be predicted by calculating expectation values using the specified first time period as input to the model. In other embodiments, other types of statistical and probability distributions and models can be used to create the geo-temporal model. In some embodiments, the geo-temporal model can actually consist of a number of different mathematical and statistical models that can be referenced. In various embodiments, predicting device location and user interaction from a geo-temporal model can include analysis of confidence levels, as illustrated in FIG. 6.

As illustrated at step 526 of FIG. 5, an illustrative method further includes selecting an advertisement based on the predictions such that the selected advertisement can be presented to the user during the specified first period of time. At step 528, the selected advertisement is provided to the mobile device. At step 530, a determination is made that the sample design should be updated, and at a final illustrative step 532, the sample design is updated. In embodiments of the present invention, the sample design can be updated based on various assessments about the efficiency and utility of the sample design. According to embodiments of the present invention, sample design updates can include modifications resulting in more frequent data collection, less frequent data collection, data collection at different times, and the like.

Figure 6:
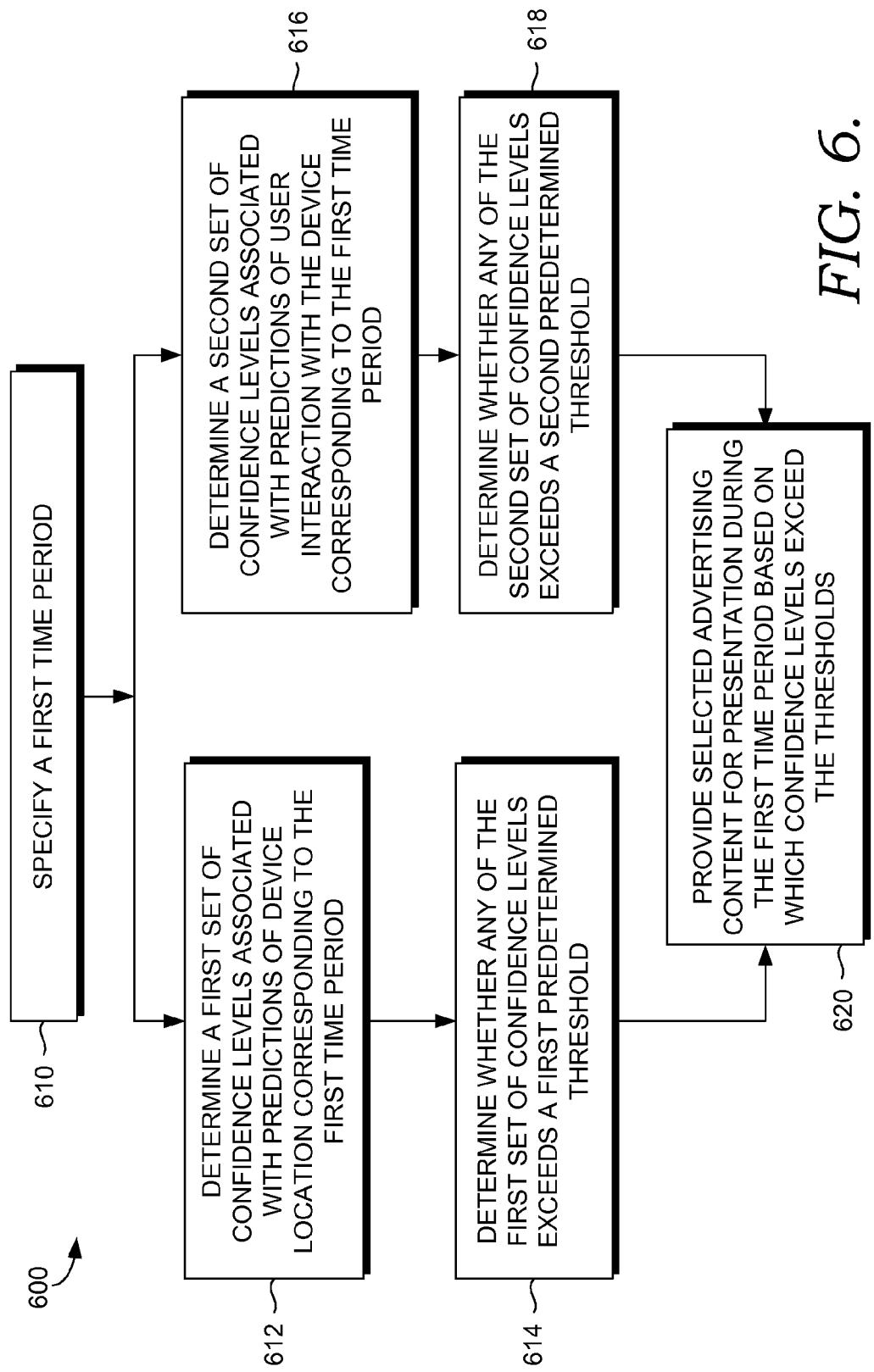
FIG. 6 is another flow diagram showing an illustrative method of targeting advertisement to a user of a mobile communications device in accordance with an embodiment of the present invention.

Turning now to FIG. 6, a flow diagram showing an illustrative method of predicting device location and user interaction information using a geo-temporal model for targeting advertising content to a user of a mobile device is illustrated. At an illustrative first step, step 610, a first time period is specified. At step 612, a first set of confidence levels associated with predictions of device location during the specified first time period is determined. At step 614, a determination is made whether any of the first set of confidence levels exceeds a first predetermined threshold.

As illustrated in FIG. 6, a second set of confidence levels associated with predictions of user interactions with the device during the specified first time period is determined, as shown at step 616. At step 618, a determination is made whether any of the second set of confidence levels exceeds a second predetermined threshold. At a final illustrative step, step 620, selected advertising content is provided for presentation to the user during the specified first time period. In embodiments, advertising content is selected based on which confidence levels exceed the respective thresholds. For instance, in one embodiment, some advertisements may be selected based on an at least 80% confidence level associated with a particular prediction of device location and an at least 80% confidence level associated with a corresponding prediction of user interaction with the device. In other embodiments, some advertising content may be selected based on the location prediction, regardless of the outcome of the user interaction prediction, and vice versa. Decisions such as these can be made to accommodate particular business plans, bandwidth management directives, and the like.

Figure 7:
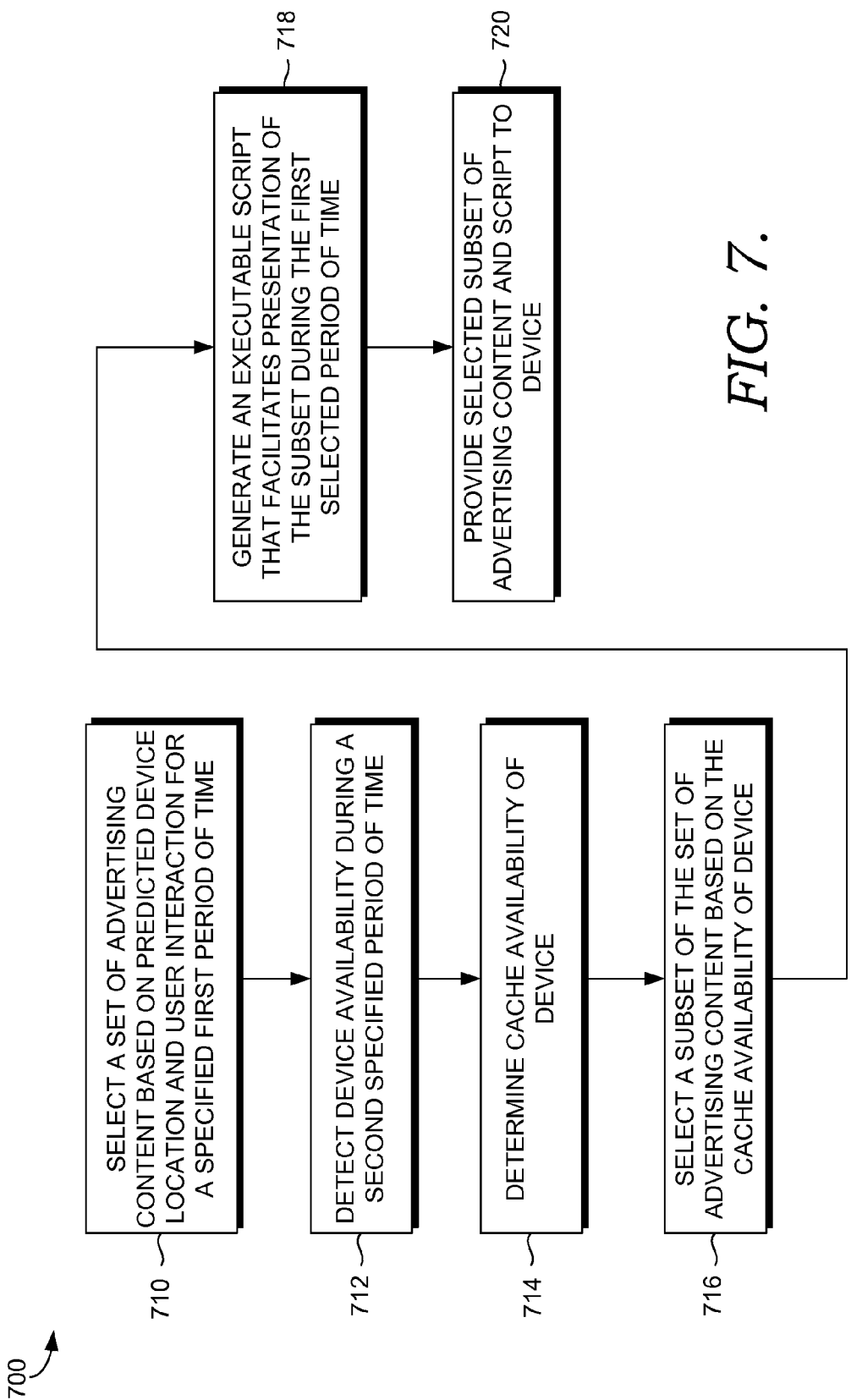
FIG. 7 is another flow diagram showing an illustrative method of targeting advertisement to a user of a mobile communications device in accordance with an embodiment of the present invention.

Turning now to FIG. 7, a flow diagram showing another illustrative method of targeting advertising content to a user of a mobile device based on predicted device location is illustrated. At step 710, a set of advertising content is selected based on a predicted device location and user interaction for a specified first period of time. At step 712, availability of the mobile device during a second specified period of time is detected. Generally, the second specified period of time occurs before the first specified period of time. At step 714, availability of storage space in a cache on the mobile device is determined. In an embodiment, the mobile device can report this information and in another embodiment, the information can be extracted or provided by other entities.

At step 716, a subset of the set of selected advertising content is selected based on the availability of storage space in the cache on the mobile device. At step 718, an executable script is generated. The executable script is configured to facilitate presentation of the subset of advertising content during the first specified period of time. In this way, the subset of advertising content can be provided to the device along with the script, as indicated at step 720, before the occurrence of the first specified period of time. The executable script can be configured to cause the advertising content to be displayed upon the occurrence of one or more conditions such as, for example, the occurrence of the first specified period of time, and user interaction with the device. In some embodiment, an API is included with the subset of advertising content instead of a script. In other embodiments, a tag or other simple instruction or marker that can be recognized by the mobile device can be included such that the mobile device can determine when to present the advertising content to the user.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-storage media having computer-executable instructions embodied thereon for performing a method of targeting advertising content to a user of a mobile device based on predicted device location, the method comprising:
updating a dynamic geo-temporal model comprising a representation of a plurality of locations of the mobile device during a plurality of time periods, wherein updating the dynamic geo-temporal model comprises incorporating time-stamped device location data collected according to a dynamically updateable sample design;
specifying a first time period in the future;
predicting, before the first time period, a location of the device during the first time period using the dynamic geo-temporal model;
determining a confidence level associated with the predicted location;
selecting an advertisement to provide to the device based on the predicted location and the confidence level;
providing the advertisement to the device such that the advertisement is capable of being presented to the user during the first time period;
determining that the sample design should be updated; and
updating the sample design.

2. The media of claim 1, wherein the dynamic geo-temporal model comprises at least one probability density function associated with device location data.

3. The media of claim 1, wherein updating the geo-temporal model comprises modifying one or more parameters associated with the model.

4. The media of claim 1, wherein updating the geo-temporal model comprises discarding data collected before a specified time period.

5. The media of claim 1, wherein selecting an advertisement comprises identifying an advertisement having an associated attribute that indicates that the advertisement should be presented to a user when the user interacts with the mobile device at the predicted location.

6. The media of claim 5, wherein the predicted location comprises a designated geographic region.

7. The media of claim 5, wherein selecting the advertisement further comprises:
determining available storage space associated with a cache that is maintained on the mobile device; and selecting an advertisement having an attribute that indicates an amount of memory required to store the advertisement, wherein the amount of memory required to store the advertisement is less than the determined available storage space associated with the cache.

8. The media of claim 7, wherein providing the advertisement such that the advertisement is capable of being presented to the user during the first time period comprises providing the advertisement to the mobile device such that the mobile device stores the advertisement in the cache.

9. The media of claim 8, wherein providing the advertisement further comprises including an indication that the advertisement should be presented during the first time period when the user interacts with the mobile device.

10. The media of claim 1, updating the sample design comprises changing at least one of the frequency and pattern of instances of data collection.

11. One or more computer-storage media having computer-executable instructions embodied thereon for performing a method of targeting advertising content to a user of a mobile device based on predicted device location, the method comprising:
- collecting time-stamped device location data corresponding to a plurality of instances of user interaction with the mobile device;
- updating a dynamic geo-temporal model that represents a hypothesized relationship between user interaction with the mobile device and the location of the mobile device when the user interacts with the mobile device;
- specifying a first time period in the future;
- predicting, before the first time period, that the user will interact with the mobile device during the first time period, wherein predicting comprises referencing the dynamic geo-temporal model, and wherein a first confidence level associated with the predicted user interaction is determined;
- predicting, before the first time period, that the mobile device will be at a first location during the first time period;
- determining a second confidence level associated with the predicted user location; and
- providing a selected advertisement to the mobile device such that the advertisement is capable of being stored in a cache on the mobile device and presented to the user during the first time period, wherein the advertisement is selected based on the first location, the first confidence level, and the second confidence level.

12. The media of claim 11, wherein collecting time-stamped device location data comprises determining location information associated with the mobile device during each of the plurality of instances of user interaction with the mobile device.

13. The media of claim 12, wherein location information comprises addressing information.

14. The media of claim 12, wherein location information comprises a designated geographic location.

15. The media of claim 11, wherein providing the advertisement to the mobile device further comprises providing an executable script to the mobile device, wherein the executable script is configured to cause the advertisement to be presented to the user during the first time period.

16. The media of claim 11, further comprising selecting the advertisement based upon an available amount of storage space associated with the cache.

17. One or more computer-storage media having computer-executable instructions embodied thereon for performing a method of targeting advertising content to a user of a mobile device based on predicted device location, the method comprising:
- referencing a dynamically updateable sample design for identifying a plurality of sampling time periods during which to collect location information associated with the mobile device;
- detecting an instance of user interaction with the mobile device during each of a subset of the plurality of sampling time periods;
- collecting time-stamped device location data associated with the mobile device in response to detecting each instance of user interaction with the device;
- updating a dynamic geo-temporal model from the collected time-stamped device location data;
- specifying a first time period in the future;
- determining, before the first time period, a first confidence level associated with a prediction of user interaction with the mobile device corresponding to the first time period;
- determining, before the first time period, a second confidence level associated with a prediction of a first device location during the first time period;
- comparing the first and second confidence levels to a first and a second predetermined threshold;
- determining availability of storage space in a cache on the mobile device;
- upon at least one of the first and second confidence levels exceeding the corresponding threshold, determining an advertisement based on at least the first device location and the storage space in the cache;
- providing the advertisement such that the advertisement is capable of being presented to the user during the first time period; and
- updating the sample design based on at least one of the first and the second confidence levels.

18. The media of claim 17, wherein providing the advertisement such that the advertisement is capable of being presented to the user during the first time period comprises including an indication with the advertisement that indicates to the mobile device that the advertisement should be presented to the user during the first period of time.

19. The media of claim 17, wherein providing the advertisement such that the advertisement is capable of being presented to the user during the first time period comprises providing an executable script to the mobile device, wherein the executable script is configured to cause the advertisement to be presented to the user during the first time period.

20. The media of claim 17, wherein updating the sample design based on at least one of the first and the second confidence levels comprises changing at least one of the frequency and pattern of instances of data collection.

* * * * *